United States Patent Office 2,784,805
Patented Mar. 12, 1957

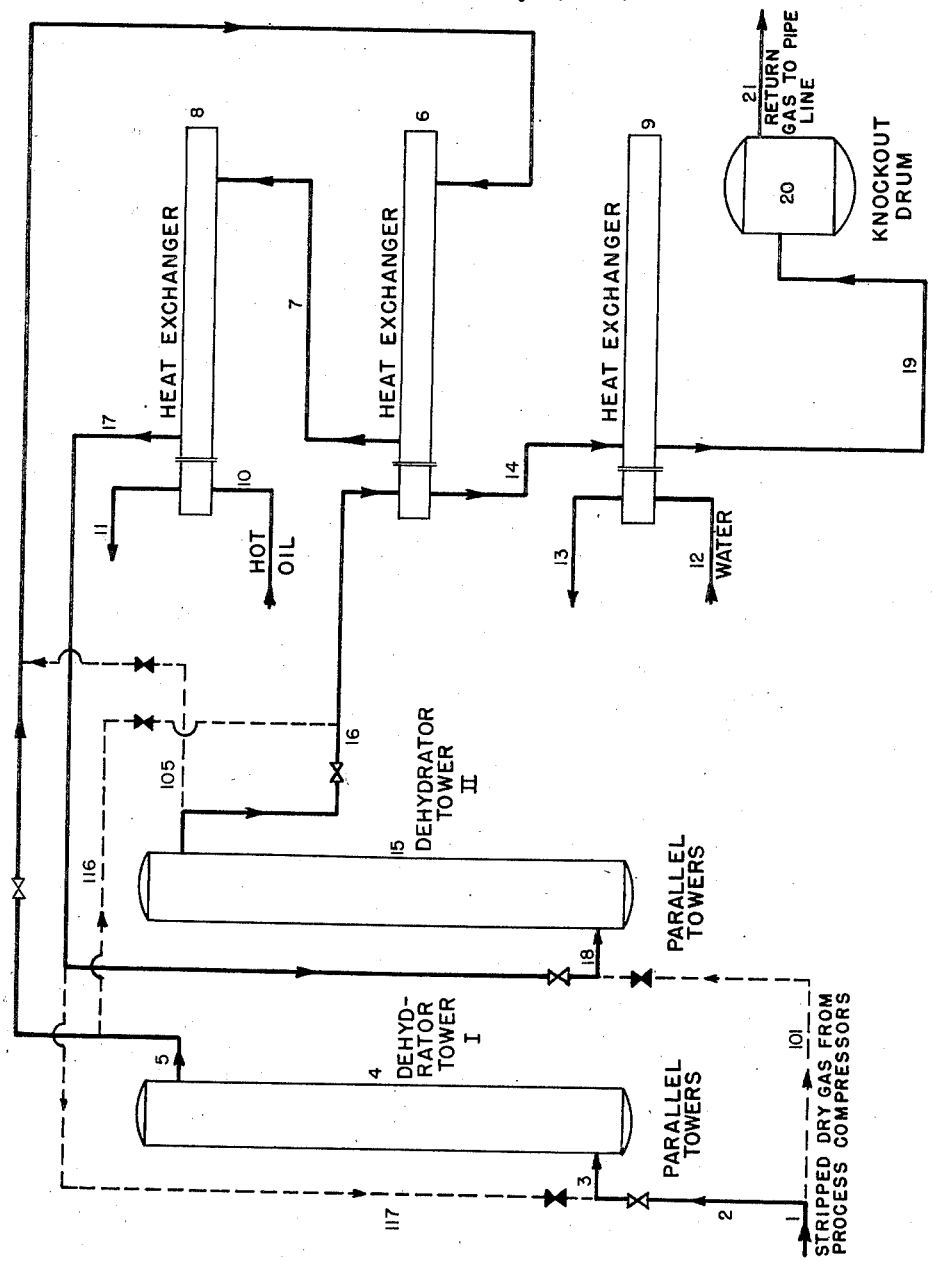
JOHN D. ODLE
ROSS WILSON
*INVENTOR.*

2,784,805

DEHYDRATOR REGENERATION

John D. Odle, Champaign, and Ross Wilson, Tuscola, Ill., assignors to National Petro-Chemicals Corporation, New York, N. Y., a corporation of Delaware Application May 2, 1955, Serial No. 505,102

3 Claims. (Cl. 183—114.2)

This invention relates to a process for treating and purifying gases used in carrying out synthetic chemical processes and is especially concerned with regeneration of the dehydrator system used for drying gas streams for chemical operations.

Gas streams containing normally gaseous hydrocarbons having 5 or less carbon atoms and also containing nitrogen, hydrogen, water vapor, and small amounts of other materials, and which streams are intended for use in chemical synthesis operations including such steps as oxidation, hydration, halogenation, hydrogenation, polymerization and the like, are normally subjected to dehydration prior to their use as chemical raw materials.

These gaseous streams can, for example, be contacted with dehydrating material in dehydrator units for instance in the form of single or multiple towers which can be arranged in series and/or parallel for more efficient semicontinuous or continuous plant operations. These dehydrators may be of any type preferred. They are customarily charged with a dehydrating agent, such as activated alumina, silica gel, bauxite, fuller's earth, calcium chloride, activated charcoal, etc. In the dehydrators, substantially all of the water is removed from the gas stream. This water removal is necessary to prevent freezing and formation of solid hydrates in the gaseous feed stream, as well as interference with reactions during subsequent chemical processes. From the dehydrator units, the dry gas stream is passed to the desired chemical synthesis and processing units.

Following a period of dehydration of gaseous streams, it is necessary to subject the dehydrators to a regeneration process. This regeneration is normally carried out by contacting the wet dehydrators with unprocessed gas which contains a relatively large proportion of $C_2$ and higher hydrocarbons. Following regeneration, it is usually necessary to cool the dehydrating material before returning the dehydrators to operation. The dehydrating material is normally unprocessed gas. In many cases, this gas is desirable for use in extraction and processing units and is needlessly by-passed into the dehydrator for regeneration.

It has now been discovered that the dry gas from chemical plant operations which has already been stripped of substantially all of the hydrocarbons above methane, is much superior and results in many advantages when used for dehydrator regeneration. In particular, the same gas stream is used for both (1) dehydrator heating in order to drive off the adsorbed water from the spent desiccant and (2) dehydrator cooling in order to adjust the temperature of the dehydrator and the desiccant for immediate return to dehydration service.

This novel system has the following advantages over the use of the raw inlet gas containing not only a major portion of methane but, in addition, substantial amounts of other higher hydrocarbons useful for chemical synthesis, operations and for sales as hydrocarbon fuel product.

(1) A much smaller gas stream (reduced by approximately 50%) is used for dehydrator regeneration since the same gas stream is used twice (that is, both for dehydration and subsequent cooling).

(2) Use of the dry "stripped" gas stream rather than a raw or "unstripped" gas stream results in making available for chemical processing a much larger quantity of unstripped gas.

(3) Such contaminating materials as water and heavy hydrocarbon oils which are normally present in the raw, unstripped gas and which would adversely affect the desiccant material on the regeneration cycle are not present in the dry stripped gas.

An approximate analysis of a typical sample of dry "stripped" gas is as follows:

| | Percent |
|---|---|
| Methane | 95.0 |
| Ethane | 4.3 |
| Propane | 0.4 |
| Butane and heavier | 0.3 |

An approximate analysis of a typical sample of wet "unstripped" gas is as follows:

| | Percent |
|---|---|
| Methane | 79.0 |
| Ethane | 6.5 |
| Propane | 3.3 |
| Butane and heavier | 0.7+ |
| Nitrogen | 10.5 |
| Helium | Trace |
| Argon | Trace |
| Heavy oils | Trace |
| Water | Trace |

In commercial scale operations for obtaining and treating hydrocarbon streams to be used for chemical synthesis, more than one dehydrator is normally employed. These may be, for instance, employed in series such that the gas stream to be dried passes through more than one of such dehydrators which are usually in the form of towers. This provides greater drying efficiency. It is desirable to carry out synthetic operations on a continuous or semicontinuous scale. In order to do this, one or more of the dehydrators should be employed in parallel with the dehydration unit in operation. Parallel towers are most conveniently employed to facilitate dehydration and subsequent cooling prior to placing the regenerated dehydrator back into full service. The time cycle for these processes can be readily varied to provide maximum efficiency and its adjustment will depend on volume of gas stream being treated, size of dehydrators, type of dehydrating agent, temperature used, and other variable conditions.

This improved process is generally carried out by contacting stripped, dry gas with a hot, dehydrated desiccant bed of one dehydrator for the purpose of cooling the bed. The exit gas, having increased heat content since its passage through the desiccant bed, is passed in heat exchange with the gas stream to be used for heating and dehydration of the spent desiccant. The gas is heated to the temperature required for effective regeneration and passed through the spent dehydrator in order to drive off adsorbed water from the desiccant. The resulting exit stream exchanges heat with the gas stream which is ultimately going into the spent dehydrator, prior to cooling by suitable means. The cooled gas is then freed from desorbed water by means of a knockout drum. The cycle is reversed by suitable additional piping and valves when dehydrators undergoing regeneration and cooling are reversed.

Studies carried out for substantial period of time after installation of the improved system have shown that an additional 16,000,000 standard cubic feet per day of rich gas has been made available for processing in chemical synthesis units. This additional 16,000,000 s. c. f. d. of gas has resulted in an average recovery of 20,000 gallons per day of additional liquified petroleum products and an additional 400,000 s. c. f. d. of ethane which is used as feed in chemical manufacture.

The process of the invention will be described in greater detail by the following specific examples, although it is not intended to limit the invention in any way thereto.

*Example 1*

Stripped gas consisting mainly of methane (approximately 95%) and relatively free of water and at a temperature of 60–90° F., which has been compressed to a pressure sufficient to return the stream to the main processed line, is the gas stream which is used in this operation.

In the first portion of the cycle, this stripped gas stream 1 is passed by lines 2 and 3 into a dehydrator zone such as dehydration tower 4. This dehydrator zone has a major portion filled with an appropriate desiccant to constitute a desiccant bed of suitable thickness. This tower, including the bed, has been previously heated to drive off adsorbed water. The dry, stripped gas passes through the tower 4 and out by line 5. From line 5, this gas of varying temperature, is passed through heat exchanger 6. In heat exchanger 6, heat is exchanged with hot gases used in the heating cycle. These hot gases come into heat exchanger 6 via line 16 from a second dehydrator zone as represented by dehydrator tower 15. They then pass out of heat exchanger 6 via line 14. The gas passed into heat exchanger 6 from line 5 is passed by line 7 into heat exchanger 8. Here the gas is heated to the temperature required to drive off adsorbed moisture in tower 15, by heat exchange with hot oil or the like entering heat exchanger 8 via line 10 and leaving via line 11. The hot gas stream is passed by lines 17 and 18 into the second tower 15 which, on this phase of the cycle, contains a desiccant bed, requiring regeneration because of its adsorbed water content. The hot gases passed by line 17 drive off this adsorbed water and thus regenerate the desiccant for reuse. This hot, wet gas stream is passed from tower 15 through line 16 and thence into heat exchanger 6, as above described. The gas stream is passed out by line 14, into heat exchanger 9. Here the gas is cooled by cooling water which enters via line 12 and leaves by line 13. The cooled gas stream, at a temperature of about 60° to 90° F., is passed by line 19 into a knockout drum 20 where the water, desorbed in tower 15, is removed. The gas is then returned via line 21 into the main processed gas pipeline.

*Example 2*

In order to show the flow of gas on the reverse cycle, the dotted lines indicate the piping. In this cycle, dehydrator tower 4 is being heated, while dehydrator tower 15 is undergoing cooling. The open and closed valves are reversed.

The stripped gas stream is passed via line 101 into dehydrator tower 15, which has been previously heated to drive off adsorbed water. The gas passes through tower 15 and out by line 105. From line 105, this gas stream is passed into heat exchangers 6 and 8 where the gas undergoes heating to a temperature necessary to drive off the adsorbed moisture in dehydrator tower 4. The hot gas stream is passed by lines 17 and 117 into tower 4, which, on this phase, contains a desiccant bed which requires regeneration because of adsorbed water content. The heated gases passed into the tower by 117 drive off the adsorbed water and regenerate the desiccant bed for reuse. The resulting hot, wet gas stream is passed out of tower 4 by line 116 and thence into heat exchanger 6. The remaining portion of the gas stream flow is essentially the same as that described in Example 1.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. In a process in which at least two dehydration zones are employed for removal of moisture from moisture-containing gaseous streams, each of said zones containing a solid, particulate adsorbent for adsorption of moisture from said gaseous stream by contacting said stream with said adsorbent, the improvement which comprises passing a substantially moisture-free gas into contact with a dry active bed of adsorbent in one of said dehydration zones, said active bed being at a temperature higher than desired for dehydration use and said substantially moisture-free gas being lower in temperature than said bed of active adsorbent, whereby the active adsorbent is cooled to a temperature for its use in dehydration and said substantially moisture-free gas is increased in temperature, subjecting the substantially moisture-free gas of increased temperature to indirect heat exchange with a hot moisture-containing gas stream, obtained as described hereinafter from regeneration of a moisture-laden adsorbent in another dehydration zone, to increase the temperature of said substantially moisture-free gas, adjusting said substantially moisture-free gas to a temperature suitable for dehydrating spent moisture-laden adsorbent in said other dehydration zone, contacting said adsorbent in said other dehydration zone with said substantially moisture-free gas at said adjusted temperature whereby to regenerate said adsorbent by desorption of adsorbed water therefrom, to produce a regenerated adsorbent and a hot gas containing water desorbed from said adsorbent, and utilizing said hot gas containing desorbed water as the hot moisture-containing gas stream for the aforesaid indirect heating of the substantially moisture-free gas.

2. The improvement, as defined in claim 1, wherein the substantially moisture-free gas is a hydrocarbon gas containing at least about 95% methane.

3. The improvement, as defined in claim 2, wherein the hot gas containing desorbed water, following its utilization in indirect heat exchange with the substantially moisture-free gas, is cooled to a temperature sufficient to separate desorbed water therefrom.

References Cited in the file of this patent

UNITED STATES PATENTS 1,998,774   Bulkeley _____ Apr. 23, 1935

FOREIGN PATENTS 513,899   Belgium _____ Sept. 30, 1952